United States Patent
Gottin et al.

(10) Patent No.: US 12,298,423 B2
(45) Date of Patent: May 13, 2025

(54) EVENT DETECTION ON FAR EDGE MOBILE DEVICES USING DELAYED POSITIONING DATA

(71) Applicant: Dell Products L.P., Round Rock, TX (US)

(72) Inventors: Vinicius Michel Gottin, Rio de Janeiro (BR); Eric L. Caron, Ottawa (CA); Nalinkumar Mistry, Ottawa (CA); Pablo Nascimento da Silva, Niteroi (BR); Paulo Abelha Ferreira, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 165 days.

(21) Appl. No.: 17/813,209

(22) Filed: Jul. 18, 2022

(65) Prior Publication Data
US 2024/0019532 A1    Jan. 18, 2024

(51) Int. Cl.
*G01S 5/02* (2010.01)

(52) U.S. Cl.
CPC ........ *G01S 5/0294* (2013.01); *G01S 5/02685* (2020.05)

(58) Field of Classification Search
CPC .......................... G01S 5/0294; G01S 5/02685
USPC ........................................................ 342/450
See application file for complete search history.

(56) References Cited

U.S. PATENT DOCUMENTS

| | | | |
|---|---|---|---|
| 6,393,362 B1 | 5/2002 | Burns | |
| 8,169,335 B2 | 5/2012 | Frederick et al. | |
| 9,547,969 B2 | 1/2017 | Beggs et al. | |
| 9,674,498 B1 | 6/2017 | Mukherjee et al. | |
| 11,086,328 B2 | 8/2021 | Keivan et al. | |
| 11,165,954 B1 | 11/2021 | Beach et al. | |
| 11,577,741 B1 | 2/2023 | Reschka et al. | |
| 12,012,318 B2 | 6/2024 | Gottin et al. | |
| 2009/0109049 A1 | 4/2009 | Frederick et al. | |
| 2010/0208064 A1 | 8/2010 | Liu et al. | |
| 2010/0228427 A1 | 9/2010 | Anderson et al. | |
| 2011/0010023 A1 | 1/2011 | Kunzig et al. | |

(Continued)

FOREIGN PATENT DOCUMENTS

| | | |
|---|---|---|
| CN | 106651884 B | 10/2019 |
| CN | 112613586 A | 4/2021 |

(Continued)

OTHER PUBLICATIONS

Liu et al, "T-C3D: Temporal Convolutional 3D Network for Real-Time Action Recognition" AAAI, 2018, (Year: 2018).

(Continued)

*Primary Examiner* — Harry K Liu
(74) *Attorney, Agent, or Firm* — Workman Nydegger (57) ABSTRACT

Real-time event detection is performed on nodes in an environment using position data that is not available to a node in real time but is delayed. A node performs real time event detection by predicting a position of the node based at least in part on delayed position data. The delayed position data is aligned to other sensor data. Aligning the position data may include predicting a position based on dead reckoning and/or a machine learning model. One or more collections of data, each collection including sensor data and predicted position data, is input to a model that performs event detection.

16 Claims, 8 Drawing Sheets

(56) References Cited

U.S. PATENT DOCUMENTS

| | | |
|---|---|---|
| 2011/0093134 A1 | 4/2011 | Emanuel et al. |
| 2011/0279261 A1 | 11/2011 | Gauger et al. |
| 2012/0025964 A1 | 2/2012 | Beggs et al. |
| 2012/0083947 A1 | 4/2012 | Anderson et al. |
| 2014/0191869 A1 | 7/2014 | Frederick |
| 2014/0324336 A1 | 10/2014 | Prokhorov et al. |
| 2015/0145661 A1 | 5/2015 | Beggs et al. |
| 2016/0129592 A1 | 5/2016 | Saboo et al. |
| 2016/0180713 A1 | 6/2016 | Bernhardt et al. |
| 2017/0297569 A1 | 10/2017 | Nilsson et al. |
| 2017/0337820 A1 | 11/2017 | Glatfelter et al. |
| 2017/0356596 A1 | 12/2017 | Frederick |
| 2018/0203727 A1 | 7/2018 | Jarvis et al. |
| 2019/0043351 A1 | 2/2019 | Yang et al. |
| 2019/0268722 A1 | 8/2019 | Elswick et al. |
| 2020/0225673 A1 | 7/2020 | Ebrahimi et al. |
| 2020/0334837 A1 | 10/2020 | Feigl et al. |
| 2021/0273858 A1 | 9/2021 | Radovanovic et al. |
| 2022/0066456 A1 | 3/2022 | Ebrahimi et al. |
| 2022/0089372 A1 | 3/2022 | Phillips et al. |
| 2022/0394531 A1 | 12/2022 | Jeong et al. |
| 2022/0409991 A1 | 12/2022 | Ohashi et al. |
| 2023/0030039 A1 | 2/2023 | Drapeko et al. |
| 2023/0159027 A1* | 5/2023 | Pronovost ......... B60W 60/0027 701/26 |
| 2023/0221942 A1 | 7/2023 | Zhang et al. |
| 2023/0305564 A1 | 9/2023 | Gottin et al. |
| 2023/0368129 A1 | 11/2023 | Gottin et al. |
| 2024/0020549 A1 | 1/2024 | Ferreira et al. |
| 2024/0020557 A1 | 1/2024 | Ferreira et al. |
| 2024/0020571 A1 | 1/2024 | Ferreira et al. |
| 2024/0190473 A1 | 6/2024 | Akella et al. |
| 2024/0311731 A1 | 9/2024 | Caron et al. |

FOREIGN PATENT DOCUMENTS

| | | | |
|---|---|---|---|
| CN | 112945227 A | * | 6/2021 |
| CN | 114460537 A | * | 5/2022 |
| CN | 114527676 A | | 5/2022 |
| DE | 10202100452 A1 | | 7/2022 |
| WO | 2022/156947 A1 | | 7/2022 |
| WO | 2023/287176 A1 | | 1/2023 |

OTHER PUBLICATIONS

"How Accurate Are RFID Systems?"—RFID Journal; (Accessed Oct. 28, 2022).

B. Alexe, T. Deselaers and V. Ferrari, "Measuring the objectness of image windows," IEEE transactions on pattern analysis and machine intelligence, vol. 11, No. 34, pp. 2189-2202, 2021.

B. Kim, C. Kang, J. Kim, S. Lee, C. Chung and J. Choi, "Probabilistic vehicle trajectory prediction over occupancy grid map via recurrent neural network," in 20th International Conference on Intelligent Transportation Systems (ITSC), 2017.

B. McMahan, E. Moore, D. Ramage, S. Hampson and B. y Arcas, "Communication-efficient learning of deep networks from decentralized data.," In Artificial Intelligence and Statistics, pp. 1273-1282, 2017.

C. Hegde, S. Dash and P. Agarwal, "Vehicle Trajectory Prediction using GAN," in Fourth International Conference on I-SMAC (IoT in Social, Mobile, Analytics and Cloud)(I-SMAC) , 2020.

C. L. Zitnick and P. Dollár, "Edge boxes: Locating object proposals from edges.," European conference on computer vision, pp. 391-405, 2014.

Gal, Yarin, and Zoubin Ghahramani. "Dropout as a Bayesian approximation: Representing model uncertainty in deep learning." international conference on machine learning. PMLR, 2016.

Inpixon—Bluetooth Location Tracking & Positioning, https://www.inpixon.com/technology/standards/bluetooth-low-energy (Accessed Oct. 28, 2022).

J. Bernstein, Y. X. Wang, K. Azizzadenesheli and A. Anandkumar, "signSGD: compressed optimisation for non-convex problems," CoRR, vol. abs/1802.04434, 2021.

K. M. Rashid and A. H. Behzadan, "Risk Behavior-Based Trajectory Prediction for Construction Site Safety Monitoring," Journal of construction engineering and management, 2018.

Li, "Federated learning: Challenges, methods, and future directions," IEEE Signal Processing Magazine, vol. 37, No. 3, pp. 50-60, 2020.

Link Labs—"The Complete Active RFID Overview", Mar. 14, 2018.

Oza, P., & Patel, V. M. (2019). "C2ae: Class Conditioned Auto-Encoder for Open-set Recognition." In Proceedings of the IEEE/CVF Conference on Computer Vision and Pattern Recognition (pp. 2307-2316).

P. Tang, X. Wang, A. Wang, Y. Yan, W. Liu, J. Huang and A. Yuille, "Weakly supervised region proposal network and object detection," Proceedings of the European conference on computer vision (ECCV), 2018.

S. Srikanth, J. Ansari, R. Ram, S. Sharma, J. Murthy and K. Krishna, "Infer: Intermediate representations for future prediction," in IEEE/RSJ International Conference on Intelligent Robots and Systems (IROS) , 2019.

U.S. Appl. No. 17/585,055, tilled, Edge-Enabled Trajectory Map Generation, filed Jan. 26, 2022.

U.S. Appl. No. 17/663,423, tilled, "Unsupervised Learning for Real-Time Detection of Far Edge Mobile Device Trajectories", filed May 14, 2022.

W.-H. Chung, G. Chakraborty, R.-C. Chen and C. Bornand, "Object Dynamics from Video Clips using YOLO Framework," 2019 IEEE 10th International Conference on Awareness Science and Technology (iCAST), Morioka, Japan, Oct. 23-25, 2019, pp. 1-6, (Year: 2019).

Wikipedia, Autoencoder, https://en.wikipedia.org/wiki/Autoencoder, Jan. 10, 2021.

* cited by examiner

EVENT DETECTION ON FAR EDGE MOBILE DEVICES USING DELAYED POSITIONING DATA

RELATED APPLICATIONS

This application is related to U.S. Ser. No. 17/663,423 filed May 14, 2022, which application is incorporated by reference in its entirety.

FIELD OF THE INVENTION

Embodiments of the present invention generally relate to logistics operations. More particularly, at least some embodiments of the invention relate to systems, hardware, software, computer-readable media, and methods for logistics operations based on delayed position data and/or predicted positions and for supporting event detection and decision-making tasks in environments that include multiple objects.

BACKGROUND

Logistics in environments such as a warehouse can be difficult to perform at least because many different objects in the environment may exist and/or operate simultaneously. Many of the objects in the warehouse, for example, are autonomous and mobile in nature while other objects are stationary or movable. In essence, all objects in an environment, whether mobile, movable, or stationary, may be a hazard from the perspective of each object. Consequently, it is difficult to coordinate the movement of multiple objects and ensure that undesirable interactions do not occur.

In addition to the hazards posed by other objects, objects may experience dangerous events without interacting with other objects. Objects such as forklifts and mobile automated robots often perform mobile maneuvers for various reasons including the layout of the warehouse, the location of product, or the like. These objects, if driven or maneuvered in an unsafe manner, may experience a dangerous event. Dangerous events may include turning too sharply or turning while driving at an excessive speed.

Improving the autonomy of mobile objects would improve the operation and efficiencies of logistical operations in these environments. More specifically, the ability to respond to events in real-time (or close enough to perform a corrective or preventative action) often depend on the ability to accurately detect those events.

Detecting an event may depend on the position or trajectory of the object. In many environments, including indoor environments, it is possible to determine the position of multiple objects. However, the determined position may not be available to the device for real-time decision making.

For example, if radio frequency identifier (RFID) tags are attached to a mobile object, these RFID tags can be read by RFID sensors located in the environment. The information read by the RFID readers is processed to determine the position of the object. The object only receives its position after the raw position data collected or generated by the RFID readers is processed and transmitted back to the object. Thus, the position of the object is delayed and not known in real time to the object. Responding to a real-time event is difficult because the mobile object may have moved to a new position while waiting for data describing the old position. These factors, among others, complicate the ability of an object to detect and to respond to undesirable events in real time.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to logistics, logistics operations and/or event detection based on delayed position data. More particularly, at least some embodiments of the invention relate to systems, hardware, software, computer-readable media, and methods for logistics, logistics operations, and/or event detection in environments that include mobile objects where position data is delayed.

An environment, such as a warehouse, may include mobile objects, movable objects, and/or stationary or static objects. These objects may include or be associated with sensors of varying types that generate data. The data may be analyzed to detect events and/or to perform actions upon detecting an event. For example, the data (or features thereof) may be input to a machine learning model. Actions performed at, by, or on the object may depend on the inference or output of the machine learning model.

The data generated by the sensors can be used to perform logistics operations, which include by way of example and not limitation, delayed position operations, position alignment operations, interpolation operations, position prediction operations, event detection operations, cornering detection operations, tracking operations, trajectory prediction operations, trajectory operations, alerting/warning operations, positioning operations, management operations, or the like or combination thereof. The logistics and logistics operations disclosed herein are based on data, including sensor data, generated at nodes and/or near edge nodes.

Embodiments of the invention are discussed in the context of mobile objects operating in a warehouse. Mobile objects may include, but are not limited to, forklifts (manual or automated), autonomous mobile robots or vehicles, automatic guided vehicles, mobile machines capable of being driven/pulled/pushed/moved, and/or the like. Embodiments may relate to mobile devices or vehicles operating in, by way of example, manufacturing, retail, and other environments.

When performing logistics operations, a machine learning model (model) receives data (or features) as input and outputs, by way of example, an inference. Before deploying the model, the model is trained. Training the model may use data that is collected from objects in one or more environments. After collecting a sufficient amount of data (e.g., position data, trajectory data, inertial data, proximity and/or other sensor data), the model is trained using the collected data. Once trained, the model can be deployed to the mobile objects.

A node may include multiple models. In example embodiments, a system may include an event detection model configured to perform real time event detection based on delayed position data and a position model configured to predict a position that can be input, along with other sensor data, to the event detection model.

In some examples, the position data needed to perform logistics operations is delayed. In one example, the data input into the event detection model may include a predicted or determined position at least because the current position is not available or is delayed. The inference or output of the event detection model may be indicative of an event such as a dangerous cornering event. The action that is triggered or caused by the inference may be to slow down, generate a warning or alert, or the like.

In some example embodiments, the delayed position data is adjusted to align with real-time sensor data. The aligned data, which includes sensor data and aligned position data, may be submitted to the event detection model for real-time event detection. Aligning the position data may or may not use a position model.

The event detection model may be trained with historical data. If the event to be detected is a dangerous cornering event, the event detection model may be trained with trajectories that include normal cornerings. This allows the event detection model to infer when a cornering is dangerous or non-normative.

Embodiments of the invention may also train the position model with available historical data such as historical trajectories. This may require a supervised learning task to label the trajectories. In one example, a position is based on a trajectory, which may include multiple (e.g., three) sensor samples. These historical trajectories can be correlated to specific positions prior to training the position model. This allows the model to infer a next position based on historical trajectories.

During operation, the position model may be configured to predict a position using the delayed position data and/or other positional data as input. The input to the event detection model may include sensor data and predicted positions. This allows the event detection model to detect real time events using delayed position data or predicted positions.

In some examples, event detection may also be performed on an anticipated future position of the object. The position model may generate aligned data that corresponds to a timestamp that is greater than a timestamp of the most recent collection of sensor data. The aligned data may include extrapolated or estimated sensor data. This further allows event detection to be performed in real time using aligned data that includes both a predicted position and predicted or extrapolated sensor data. In one example, the input to the event detection model includes trajectories. Each trajectory may include, by way of example, three sets of sensor data that are each associated with a position. The positions associated with the sensor data may be determined by the position model.

From the perspective of predicting the objects' positions, the next or predicted position of the object is based on one or more of the objects' previous positions and/or historical trajectories (used to train the model). The accuracy of the model can be monitored by comparing the predicted data to the delayed position once received.

Embodiments of the invention are discussed in the context of machine learning and algorithmic models. Embodiments of the invention are also discussed with respect to the operation of automated mobile robots and/or forklifts (also referred to as nodes) in a warehouse environment. Embodiments of the invention can be applied to other objects (mobile devices, vehicles, or machines) in other environments.

Embodiments of the invention can be adapted to detect different types of events and/or to generating alerts and notifications. Embodiments may also perform automated operations such as generating notifications or alerts when an event is detected, cutting power to a device, or the like. Embodiments of the invention further relate to predicting object positions and to generating aligned data that may include a predicted position.

Embodiments of the invention are achieved, in part, by equipping the objects in the environment with hardware such as sensors, processors, memory, networking hardware, or the like. In some examples, the objects may already be equipped with this type of hardware or portions thereof. The hardware may depend on the nature of the associated object. Mobile objects, for example, may be equipped with a different set of sensors compared to sensors or devices associated with a stationary or movable object. For example, hardware such as sensors, processors, memory, or the like may be integrated with a forklift or a mobile robot. A pallet, in contrast, may only have an RFID (Radio Frequency Identification) tag.

The hardware (and/or any software thereon) may be referred to as a node. However, reference to a node may also constitute a reference to the object associated with the node and on which the node is attached. Reference to an object, such as a forklift, may refer to the object and/or the node.

Nodes in the environment may communicate with a near edge node operating at a near-edge infrastructure and/or a central node operating in a datacenter. The central node is typically more computationally powerful than the near edge nodes and the near edge nodes are typically more computationally powerful than the nodes. Embodiments of the invention can be implemented with/without a central node, in which case the near edge node functions as a central node. Similarly, embodiments of the invention may be implemented with only a central node.

The sensors associated with a node may include proximity sensors and/or inertial sensors. The proximity and/or inertial sensors may generate data that allows aspects of movement to be detected, measured, or inferred. The sensor data may be augmented with position data, which may be delayed. Because the position data may be delayed, the position data may need to be aligned with the sensor data. The aligned data, which includes a collection of sensor data and a predicted or determined position, input to the event detection model.

When detecting events related to trajectories, a collection of input (e.g., data associated with each of at least three positions in one example) may be input to the event detection model. The event detection model may be trained to recognize normative events. Non-normative events may be reflected in an error (e.g., a reconstruction error of an autoencoder) of the output. The event detection model may also be trained with historical data that includes normal or suitable events. Based on the inference or output of the model, actions such as generating alerts, notifying operations, or the like may be performed. Other events may also be detected.

In some embodiments, the nodes may each have sufficient hardware (e.g., processor, memory, networking hardware) to process data generated by the node's sensors and/or data about other nodes that is broadcast by a central node, the near edge node, or by the other local nodes or other objects in the environments.

Figure 1:
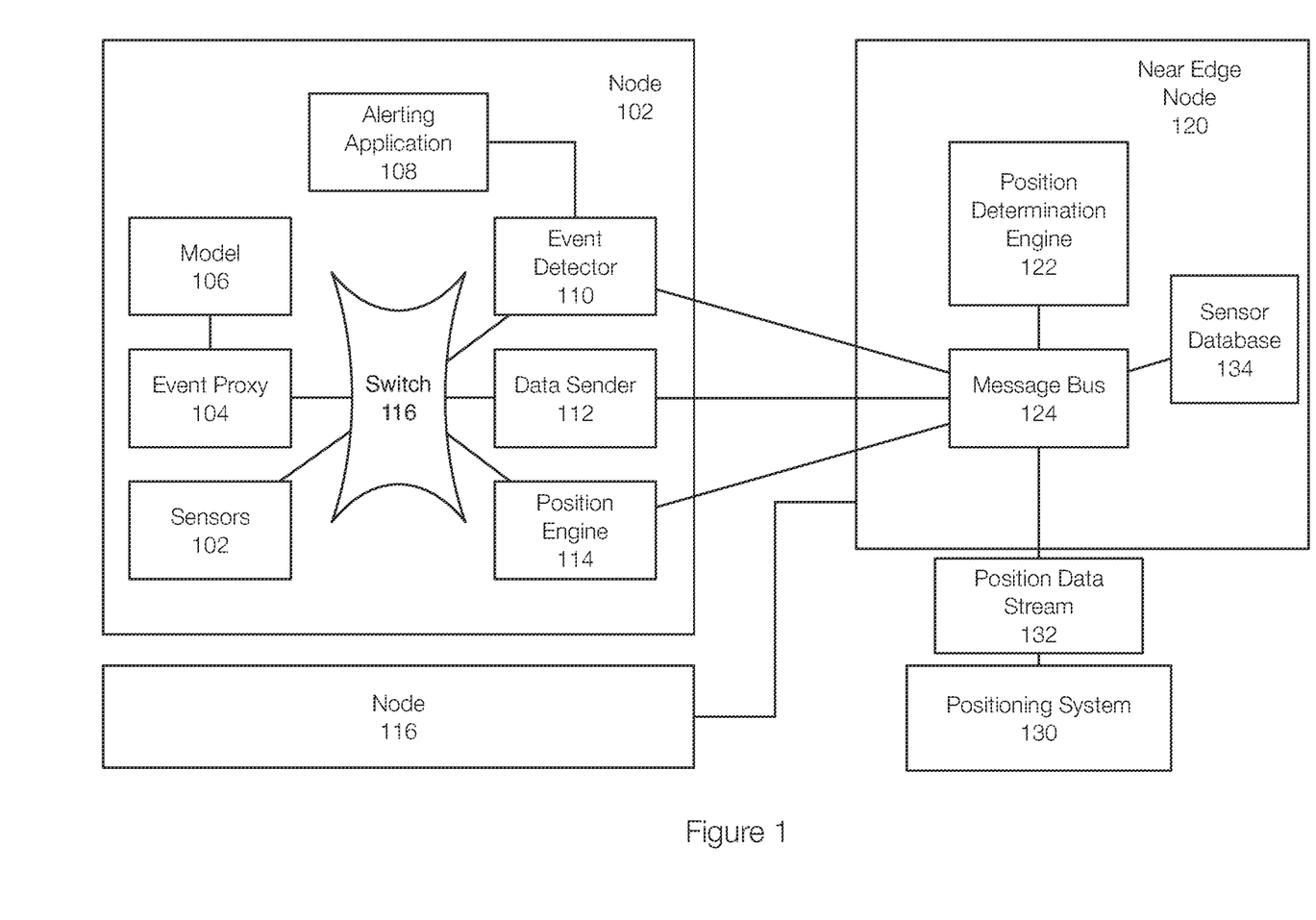
FIG. 1 discloses aspects of a logistic system, including a near edge node and nodes, that is configured to perform logistics operations using delayed position data and/or predicted object positions.

FIG. 1 discloses aspects of an environment in which logistics operations such as real-time event detection operations and position prediction operations based on delayed position data are performed. FIG. 1 illustrates a node 102 and a node 116, which are representative of nodes that may be operating in an environment. The nodes 102 and 116 may be similarly configured. A near edge node 120 is also illustrated. The near edge node 120 may be an edge station or server(s) or may operate in a datacenter. The near edge node 120 is typically more computationally powerful than the nodes 102 and 116.

The near edge node 120 is configured to generate position data that is provided to the nodes 102 and 116. More specifically, in this example, a positioning system 130 may provide a position data stream 132 to a message bus 124, which is associated with the near edge node 120. The near edge node 120 includes a position determination engine 122 that is configured to process the position data stream 132, which includes raw position data, to generate processed position data.

For example, raw positioning data may be obtained from passive RFID tags attached to each mobile device. When the passive RFID tags are read by RFID readers, the information is associated with the device's identifier. The position determination engine 122 receives the raw position data, separates out the information relevant to the node 102 (or the node 116) using the node's identifier and processes the RFID raw position data to determine the position of the node 102 in the environment.

RFID reader units that read the tags allow the position of the device whose RFID tags were read to be determined using triangulation or other method. The position data stream 132 may include RFID tag information from multiple RFID readers and the position determination engine 122 can perform triangulation or other method to determine the position of the device based on RFID information received from multiple RFID readers. Wi/Fi triangulation may also be performed.

The node 102 includes various hardware and other components that may communicate over a switch 116 or the like. In this example, data from the sensors 102, such as proximity sensors and inertial sensors, can be provided to a data sender 112. The data sender 112 may send the sensor data to the near edge node 120 to be stored in the sensor database 134.

The event proxy 104 may send data corresponding to detected cornerings to the sensor database 134 or to another cornering database and/or to the model 106, which is an example of an event detection model. More specifically, the event proxy 104 may be configured to identify data that corresponds to a specific type of event, such as a cornering event. The data associated with the cornering event can be submitted to the model 106, which may generate an inference regarding the cornering event. The inference generated by the model 106 may indicate that the cornering event is undesirable or non-normative. In one example, the event proxy 104 provides the data the event proxy 104 has identified from the sensor data to the model 106. This may converse processing by providing selected or limited data to the model 106.

In one example, the output of the model 106 (e.g., a probability or inference) may be returned to the event detector 110. The event detector 110 may use rules to determine whether an action should be performed. In this case, the alerting application 108 may generate an alert to an administer, a driver, other drivers, other devices, or the like based on an output of the event detector 110.

The position engine 114, which may be an example of a position model, may receive processed position data from the position determination engine 122 via the message bus 124, which may be configured to transmit data over a network to the node 102. The position engine 114 may be configured to align the delayed position data with the data generated by the sensors 102 by generating a predicted position associated with predicted position data. The aligned data, which includes the sensor data and/or predicted or determined position data, is provided to the event proxy 104 and/or the model 106.

Figure 2:
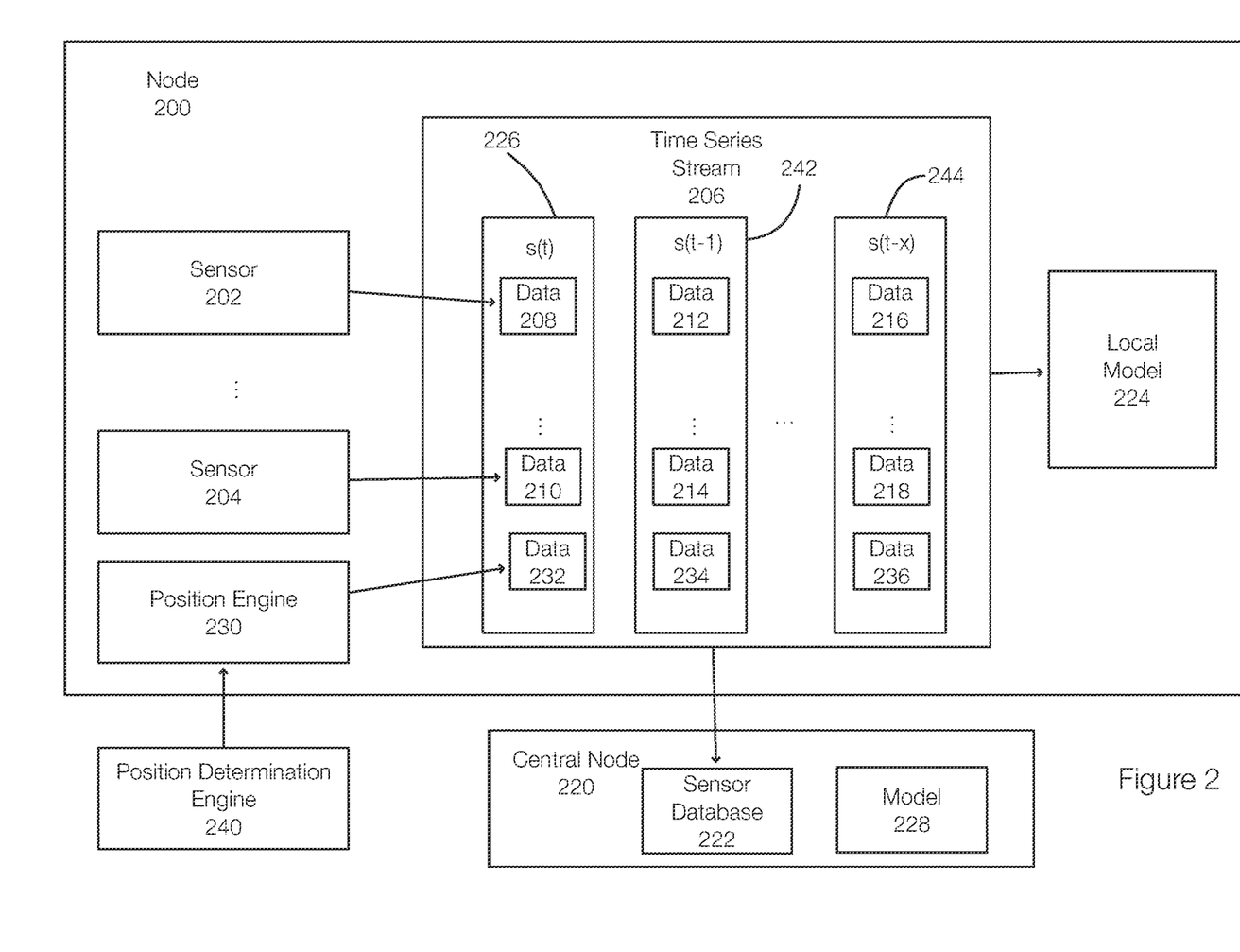
FIG. 2 discloses aspects of data collection and inference generation including position prediction in a node.

FIG. 2 discloses aspects of a node associated with or integrated with an object and configured to operate in an environment and perform logistics operations including position alignment operations. The node 200, an example of the node 102, may include sensors, represented by sensors 202 and 204. In this example, the sensors 202 and 204 may include proximity sensors and/or inertial sensors. The sensors may also include RFID tags or other devices used in determining the position of the node 200.

The node 200 collects, over time, multiple readings from the sensors 202 and 204. The data generated by the sensors 202 and 204 may constitute a time series stream 206. For example, the stream 206 includes readings at different times and the data collected at a particular time may be referred to as a collection. Thus, the time series stream 206 may include multiple collections such as the collection 226.

The data 208 and 210 in the collection 226 were collected at time s(t), the data 212 and 214 were collected at time s(t−1), and the data 216 and 218 were collected at time s(t−x). Each of the nodes that includes sensors may generate a similar sensor data stream. Data generated from the sensors 202 and 204 may be collected periodically, whenever a change in a sensor's data is detected (e.g., acceleration or deceleration is detected), or the like or combination thereof.

For a collection 226 of data associated with time s(t), a position p(t) is associated with the collection 226 of data. Embodiments of the invention may predict that position, however, using delayed position data. When collecting data from the sensors 202 and 204, the collection 226 of data may be aligned with a predicted position in the environment.

The time series stream 206 may be transmitted to a near edge node and/or a central node 220 and stored in a sensor database 222 of or associated with the central node 220. Thus, the time series stream 206 is available for use by the local model 224 to generate inferences, such as whether a dangerous or undesirable event is occurring/has occurred. The time series data from all nodes is available to the model 228, which may perform the same or similar function as the local model 224 but may generate inferences based on data from multiple nodes from one environment or multiple environments.

The time series stream 206 may be collected periodically at the central node 220. This allows the central node 220 to store sensor data from each of the nodes in the sensor database 222. The central node 220 may store position/inertial data related to dynamic, mobile, and static nodes.

When detecting events such as cornering events, data including position data and inertial data (generally referred to as positional) may be collected. The position or positioning data may include GPS (Global Positioning System) data, RFID (Radio Frequency Identification) data or WiFi triangulation data, or combination thereof. The inertial data may include inertial measurements of acceleration and deceleration. The inertial data may be obtained via inertial measurement unit (IMU) sensors.

The positional data may be used to detect cornering events. More specifically, embodiments of the invention focus on aspects of the positional data that represent cornering or trajectories that represent cornerings. However, embodiments of the invention can be adapted to detect other events that are represented by the positional data or from other sensors that may correspond to other types of events. Further, the events detected by the model 224 may be generated with collections of data that have been aligned with predicted positions that are based, at least in part, on delayed position data.

More specifically, the collections of data, such as the collections 242, 244, and 234 from the sensors 202 and 204 are respectively associated with position data, represented by the data 232, 234, and 236. In this example, the position engine 230 may receive position data from the position determination engine 240. The position engine 230 may then align the data 232 with the data 208 and 210. Similarly, the data 234 is aligned with the data 212 and 214 and the data 236 is aligned with the data 216 and 218.

In one example, the data 232, 234, and 236 may represent predicted or determined positions. As previously stated, the position data received by the position engine 230 is delayed any may not have a timestamp that matches timestamps of data in the collections 226, 242, and 244. Thus, the position engine 230 aligns the position data with the other data in the collections 226, 242, and 244.

More generally, the position engine 230 may perform an alignment operation in various way for a collection A of sensor data, which may be the attributes used for event detection and which are internally correlated with a representative timestamp.

Figure 3:
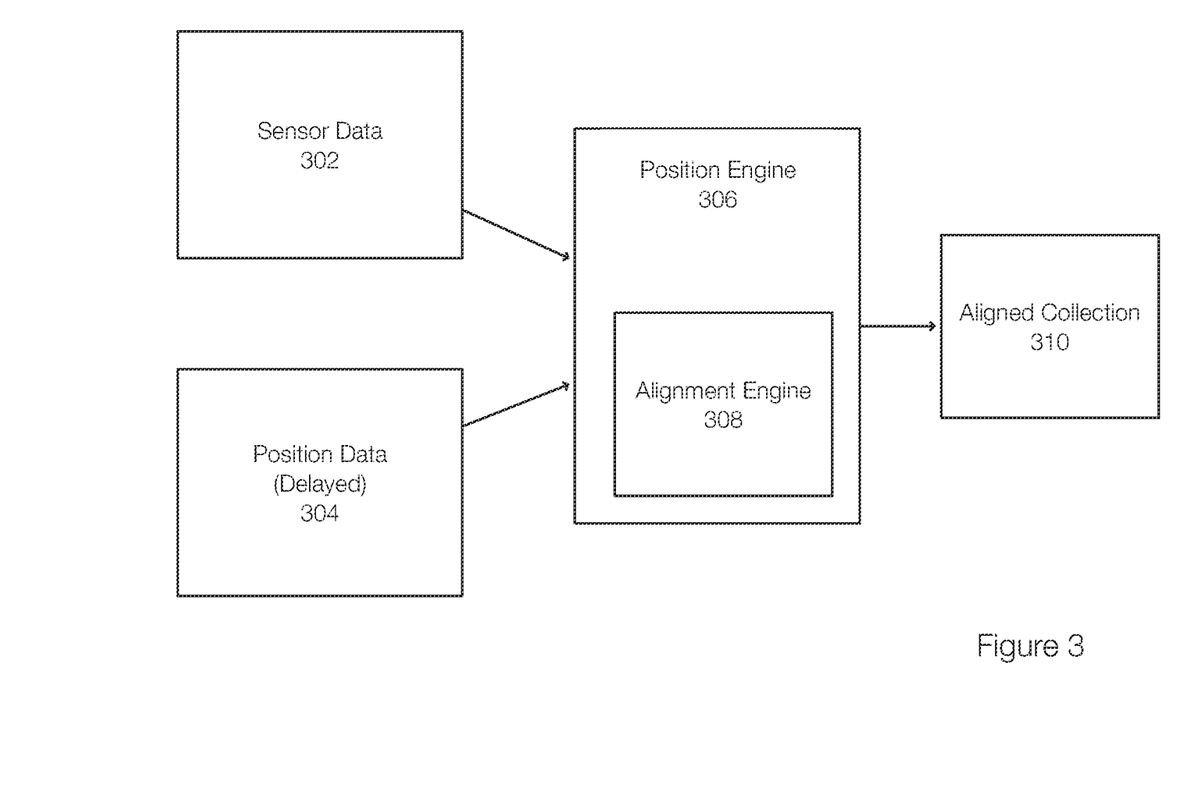
FIG. 3 discloses aspects of aligning delayed position data with sensor data in performing logistics operations.

FIGS. 3-6 illustrate aspects of aligning position data. FIG. 3 generally discloses aspects of aligning delayed position data with sensor data. In this example, sensor data 302 and delayed position data 304 may be input into the position engine 306. The position engine 306, which may include an alignment engine 308, performs an alignment operation to generate aligned data, represented by an aligned collection 310. The aligned collection may include an estimated or predicted position that is based, in one example, on the delayed position data 304.

The alignment engine 308 (or the position engine 306) may be a machine learning model that may predict the position of an object based on historical data and/or delayed position data. For instance, an object may perform similar tasks each day and have similar movements over the course of the day. The historical movement and positions of the object can be used to train the position engine 306 (or the alignment engine 308) to aid in predicting the object's position at a given time. This type of prediction, using a model trained on historical movement or trajectories, can be combined with delayed position data to predict or estimate the position of an object.

Figure 4:
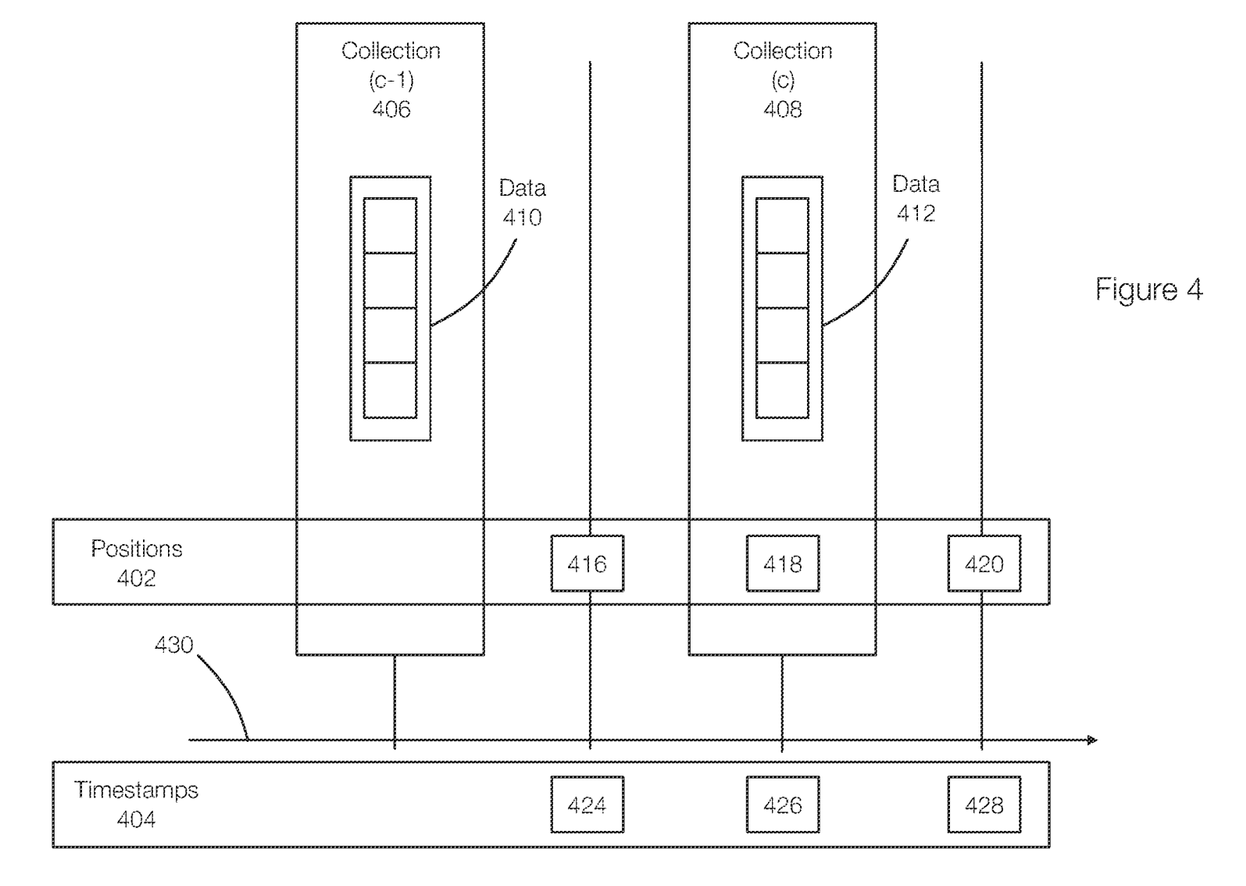
FIG. 4 discloses additional aspects of aligning delayed position data with sensor data.

FIG. 4 discloses aspects of aligning a collection. In FIG. 4, the collection 406 (c−1) and the collection 408 (c) are associated, respectively, with sensor data 410 and data 412. The data 410 and 412 are generated by sensors at an object, such as the sensors 202 and 204. FIG. 4 also illustrates positions 402, including positions 416, 418, and 420. The positions 416 and 420 are delayed positions. The timestamps 404 include the timestamps 424, 426, and 428. As illustrated, the timestamps 424 and 428 of, respectively, the delayed positions 416 and 420, do not align with the collections 406 or 408.

In this example, the position engine (e.g., using the alignment engine) performs an alignment operation that predicts the position 418 for a timestamp 426, which is the timestamp of the collection 408. As illustrated by the timeline 430, the timestamp 424 $t_{p'}$ is less than the timestamp 424 $t_A$. The timestamp 428 $t_p$ is greater that both of the timestamps 424 and 426. The A subscript indicates a timestamp of the collection 408 or collection A, which is a most recent collection referenced as (c). The subscript p' and p represent timestamps of delayed positions p' and p. In one example, the timestamp 426 $t_A$ may be an average of the timestamps associated with the data of the individual sensors.

The alignment operation illustrated in FIG. 4 includes an interpolation operation. Thus, the position 418 is an interpolated position in this example. More specifically, the position p' is a most recent position where the timestamp 424 is less than the timestamp 426. In effect, the timestamps of the delayed position data of the positions 416 and 420 are closest in time to the timestamp 426. The interpolation is performed using a time stamp on both sides of the collection 408.

While FIG. 4 allows the position 418 to be estimated from the positions 416 and 420 using interpolation, this aspect of alignment may not be available for the most recent sensor data collection at least because the position data is delayed. For example, the position data 420 may not be available. Further, if the delay between the timestamp 424 $t_{p'}$ and the timestamp 426 $t_A$ is too long, interpolation may add too much error for the purposes of making decisions. Alignment by interpolation is often used when the delay between timestamps is sufficiently small (e.g., less than 1 second or other threshold).

Figure 5A:
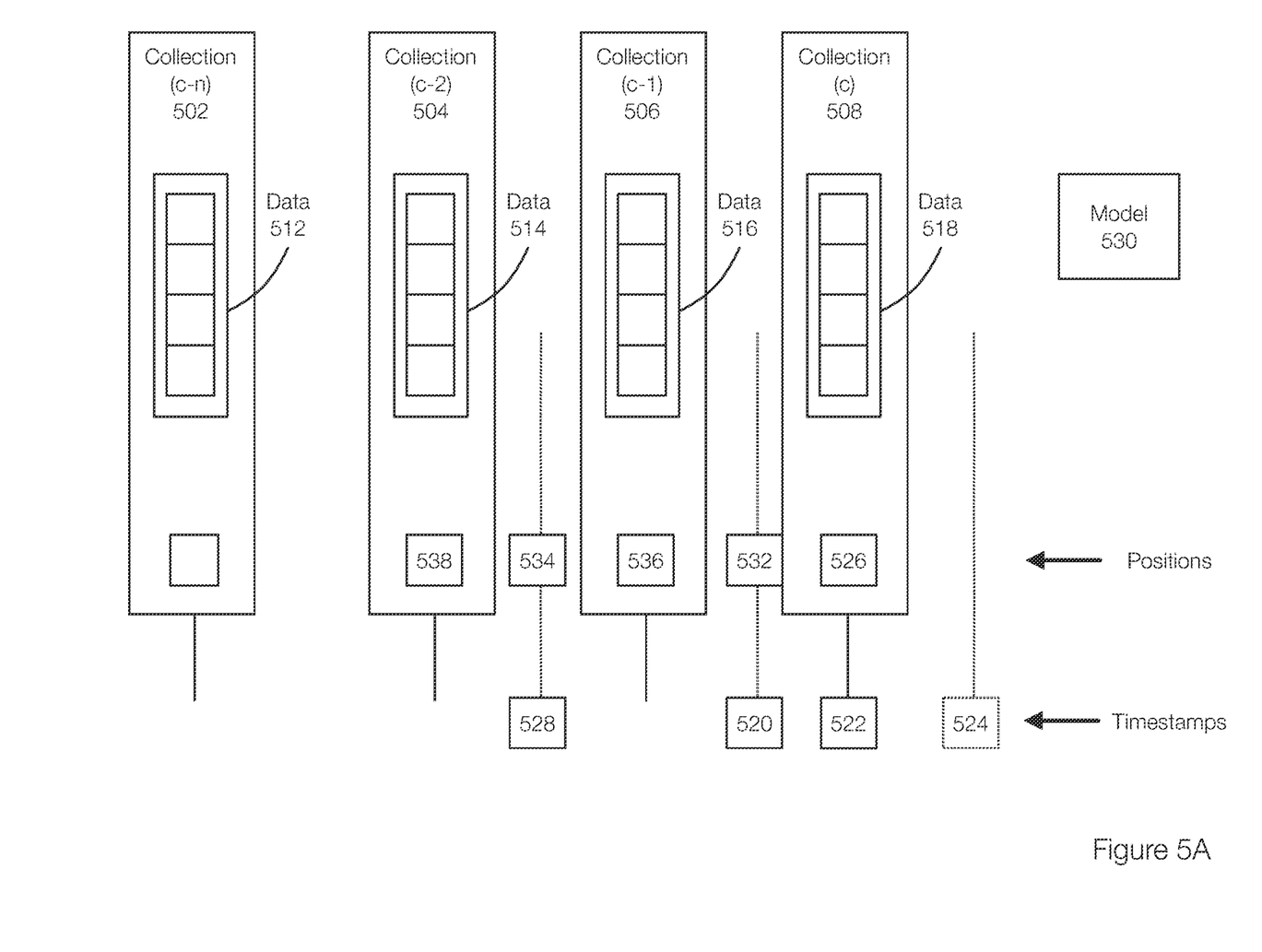
FIG. 5A discloses additional aspects of aligning delayed position data with sensor data.

FIG. 5A discloses additional aspects of performing an alignment operation. In FIG. 5, the collection 508 is the most recent sensor data collection (c). Thus, even assuming that a timestamp 520 $t_{p'}$ is available that is earlier than a timestamp 522 $t_A$, there is no timestamp 524 $t_p$ (illustrated in dashed lines to reflect that position data has not been received. Thus, no position data available for the collection 508 or after the timestamp 522 $t_A$ is available because of the delay needed to process any raw position data that may have been acquired.

In one example embodiment, the position p 526 is predicted or estimated. The position p 526 can be predicted or estimated in different manners. In one example, the predicted position 526 is predicted using a dead reckoning approach. In a dead reckoning approach, the position of the object is determined from the last known ground truth position. Thus, dead reckoning can be used to estimate or predict the current position of the object using the last known ground truth position of the object and at least inertial data. A Kalman filter is an example of such an approach.

A dead reckoning approach can be accurate right after ground truth positioning. Over time, however, dead reckoning suffers from accumulated error. For at least this reason, embodiments of the invention may predict or estimate positions using dead-reckoning and/or machine learning.

In one example, periods in which the mobile object is stationary can be determined. The mobile object may be deemed to be stationary until inertial measurements in the sensor data indicate movement. This allows a ground truth position to be known. For example, the mobile object may be stationary long enough for the delay in positioning data to be moot.

When a ground truth or stationary position is detected, the dead reckoning approach using inertial measurements may be used to determine the object's position. The dead reckoning prediction is typically valid only for a threshold amount of time (e.g., a δ value). The value of δ can be determined for a domain based on historical data. With enough historical data, the stationary period can determine a ground truth position. Next, ignoring further positioning data from the near edge node, a dead reckoning approach can be applied, and the deviation can be tracked. The analysis of the deviation may allow an appropriate value of δ to be determined for the domain. The value of δ is domain dependent and may also depend on how much uncertainty in the positioning data is acceptable for decision making purposes.

If the object has been moving for a period of time such that dead reckoning is no longer trustworthy, the output of a machine learning model, such as a position model 530 may be used. The model 530 may receive, as input, a sequence of recently available sensor data collections. This may include, in the case of a mobile object, inertial measurements of acceleration and deceleration, bearing and other kind of rich movement tracking (e.g., mast position, load weight). Higher level features such as classifications of the operational state of the device or the environment may also be received as input by the model 530. The higher-level features may include characteristics of packages loaded by the device, state of the dock doors, ground inclination, environment level alarms, and the like.

The model 530 can also be trained with historical data. When using historical trajectories, for instance, training the model 530 may include a supervised learning task where, in replaying past trajectories, a next position can be determined based on one or more previous positions. The model 530 may be domain dependent and should include domain knowledge (e.g., positions of hazards).

FIG. 5A illustrates collections 502, 504, 506, and 508. These collections are time ordered as (c−n), . . . , (c−2), (c−1), and (c). In this example, the collection 508 is the most recent collection. The collections 502, 504, 506, and 508 may be collected at regular intervals.

The model 530, depending on the sensors available in the system, may use generative adversarial networks (GANs), recurrent neural networks (RNNs), LIDAR data, or the like.

To predict the position 526, the model 530 may use any number of collections and or any number of delayed positions. Further, example embodiments may use positions that are not correlated or aligned with sensor collections such as positions 532 and 534 associated with timestamp 520 and 528. The model 530 may consider sensor collections for which no positioning is available (due to the delayed position data). The model 530 may also predict the position 526 at a target forecast time (e.g., the timestamp 522 $t_A$). The position Thus, the collections 506, 508 and the positions 532 and 534 associated with timestamps 520 and 528 may be input to the model 530, which may output an estimated or prediction position 526. In one example, the positions 536 and 538 may have been predicted at an earlier time. Once the position for the collections 508 is predicted, the triplet of collections 504, 406 and 508 may be input to the event detection model, which may detect an event based on the trajectory represented by these three collections.

Figure 5B:
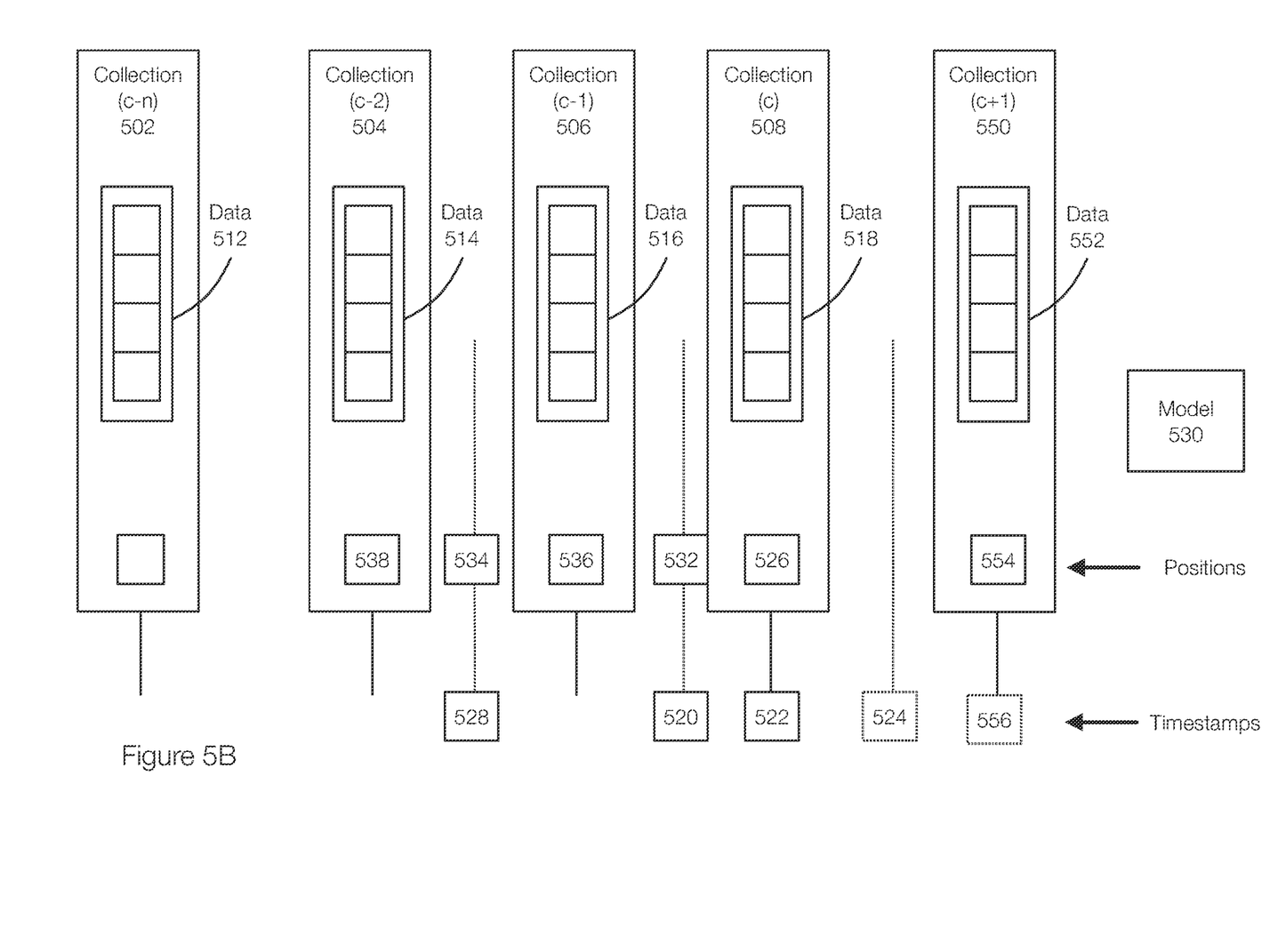
FIG. 5B discloses additional aspects of delayed position data to predict projected positions.

FIG. 5B discloses additional aspects of aligning data or for predicting positions for event detection purposes. Even if the model 530 has been trained to predict a position 526 at timestamp 522 associated with the collection 508, as described in FIG. 5A, the model 530 may be able to predict a position 554 at a timestamp 556.

In this case, the data 552 has not actually been generated or collected as the collection 508 is the most recent sensor data collection. The data 552 may be generated by carrying forward or copying the data 518 into the collection 550. Alternatively, the data 552 may be extrapolated from previous data, such as the data 518, 516, or the like. In other example, the forecast time (e.g., the timestamp 556) may be input to the model 530. In effect, this allows a position to be predicted that is ahead of the object's actual position. In other words, the prediction of the position 526 may be triggered when the collection 508 is collected at that position. In other words, the prediction of the position 526 is where the object is believed to have been and the prediction of the position 554 is for where the object will be.

The model 530 may be monitored for accuracy. In fact, the accuracy of the model can be determined once the delayed position data has been received. Once the delayed position data, which will be available after sufficient time has elapsed (longer than the processing time and transmission time), has been received, error levels of the model 530 can be verified after a prediction has been generated. In effect, the prediction can be compared to the delayed position data in hindsight. This allows other mechanisms to be used, such as a data drift detection mechanism when the accuracy falls below a threshold, which may be a baseline accuracy that may be established during training.

When the drop in accuracy is detected, the model may be retrained. The sensors of the nodes can be used to capture relevant data samples for model retraining.

In some examples, a drop in model accuracy may cause increased reliance on a dead reckoning approach. This may be achieved by increasing the value of δ, so that the model is used less. The model 530 can still be used, even if the results are discarded. If the model's accuracy returns, the value of δ may be adjusted down accordingly.

Embodiments of the invention thus determine position using a dead reckoning approach from stationary positions and then gradually adopt the predictions of a model when continuous movement is detected. Monitoring the model allows the reliance on dead reckoning approaches to be dynamically adapted. The position engine advantageously predicts positions using multiple methods, which may include dead reckoning and machine learning. The prediction may be based solely on dead reckoning, solely on the machine learning model, or on a combination thereof.

Figure 6:
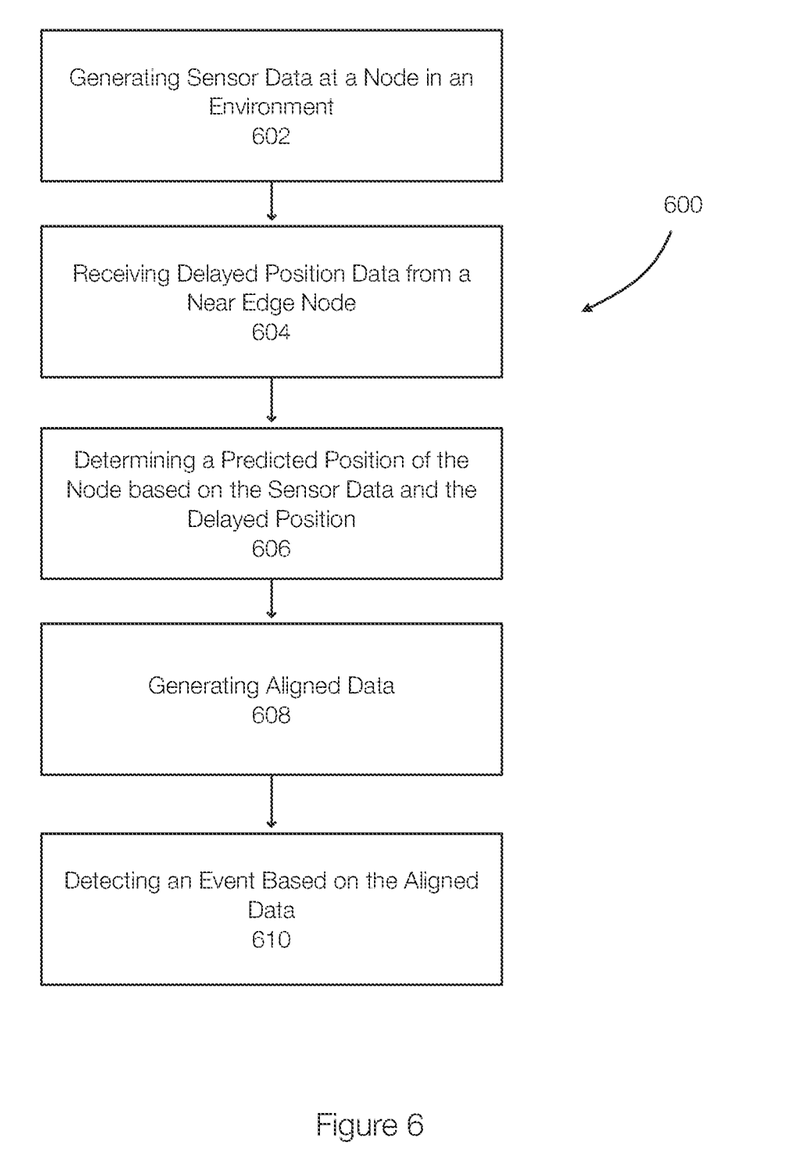
FIG. 6 discloses aspects of performing logistics operations including alignment operations using delayed position data.

FIG. 6 discloses aspects of predicting positions and/or event detection using delayed position data. The method 600 may include generating 602 sensor data at a node in an environment. The sensor data may be generated in collections, or periodically.

Next, delayed position data is received 604 from a near edge node. The near edge node may generate the position data from raw position data collected in the environment (e.g., by RFID readers that read RFID tags attached to objects).

A predicted position of the node is determined 606. The predicted position may be based on a dead reckoning approach, using a position model, or combination thereof. Typically, positions are predicted for each collection of sensor data. However, embodiments of the invention can perform logistics operations without aligned data.

Once the predicted position or positions are generated, the aligned data is generated 608. This includes associating a predicted position with a sensor data collection that has been collected or that is assumed. A predicted position may be generated for a sensor data collection that has not yet been collected or generated but is expected.

Once the collections are associated with predicted positions and assuming that a cornering is present and that the event detection model detects dangerous cornering events, the aligned data (or groups thereof—trajectories) are provided to the event detection model and events are detected 610 using the aligned collections.

The collections can be analyzed in groups (e.g., 3 collections) to identify cornering events. When a cornering event is detected, the collections may be input to an event detection model to determine if the cornering event is expected or non-normative. If the collections indicate a straight trajectory, computing resources may be conserved by not providing this data to the event detection model. The collections may be provided to other models in different manners to detect other events.

Additional aspects of the method 600 may including monitoring the model for accuracy and adapting the position prediction methodology based on the accuracy of the position model. Embodiments of the invention advantageously facilitate real time decision making or event detection using delayed position data. The impact of the delayed position data is mitigated by embodiments of the invention.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, logistics and logistics-related operations which may include, but are not limited to, position prediction operations, data alignment operations, position related operations, data collection operations, machine learning operations, or the like. More generally, the scope of the invention embraces any operating environment in which the disclosed concepts may be useful.

New and/or modified data collected and/or generated in connection with some embodiments, may be stored in a data environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data storage functionality, function functionality, model training functionality for one or more clients. Another example of a cloud computing environment is one in which processing, data protection, model training, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients (e.g., objects or devices) that are capable of collecting, modifying, and creating, data. As such, a particular client may employ, or otherwise be associated with, one or more instances of each of one or more applications that perform such operations with respect to data. Such clients may comprise physical machines, containers, or virtual machines (VM).

Particularly, devices in the operating environment may take the form of software, physical machines, containers, or VMs, or any combination of these, though no particular device implementation or configuration is required for any embodiment.

Example embodiments of the invention are applicable to any system capable of storing and handling various types of objects, in analog, digital, or other form.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: generating sensor data at a node in an environment, the sensor data including at least inertial data, receiving delayed position data from a near edge node, wherein the near edge node generates the delayed position data from a raw position data, determining a predicted position of the node based on the sensor data and the delayed position data using a position engine, and generating aligned data that includes the predicted position and the sensor data, and detecting an event based on the aligned data with an event detection model.

Embodiment 2. The method of embodiment 1, wherein the position engine determines the predicted position using a dead reckoning method and/or a position model configured to predict the predicted position.

Embodiment 3. The method of embodiment 1 and/or 2, wherein the position engine relies on the dead reckoning method when a ground truth position is known and an elapsed time from moving from the ground truth position is less than a threshold value.

Embodiment 4. The method of embodiment 1, 2, and/or 3, wherein the position engine relies on the model when the elapsed time is greater than the threshold value, wherein the position model is trained using historical inertial measurements, bearing and rich movement data, and/or classifications of an operational state.

Embodiment 5. The method of embodiment 1, 2, 3, and/or 4, wherein the position model is trained using historical position data including historical trajectories.

Embodiment 6. The method of embodiment 1, 2, 3, 4, and/or 5, wherein training using the historical position data includes a supervised learning task using past trajectories to determine a next position based at least on one or more previous positions.

Embodiment 7. The method of embodiment 1, 2, 3, 4, 5, and/or 6, wherein determining the predicted position includes interpolating a first delayed position and a second delayed position relative to a sensor data collection.

Embodiment 8. The method of embodiment 1, 2, 3, 4, 5, 6, and/or 7, wherein determining the predicted position includes predicting a position for a most recent sensor data collection.

Embodiment 9. The method of embodiment 1, 2, 3, 4, 5, 6, 7, and/or 8, wherein determining the predicted position includes predicting a position for a time after the most recent sensor data collection.

Embodiment 10. The method of embodiment 1, 2, 3, 4, 5, 6, 7, 8, 9, and/or 9, wherein a sensor collection for the time after the most recent sensor data collection is generated by extrapolating the most recent sensor data collection or by copying the most recent data collection into the sensor collection for the time after the most recent sensor data collection.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
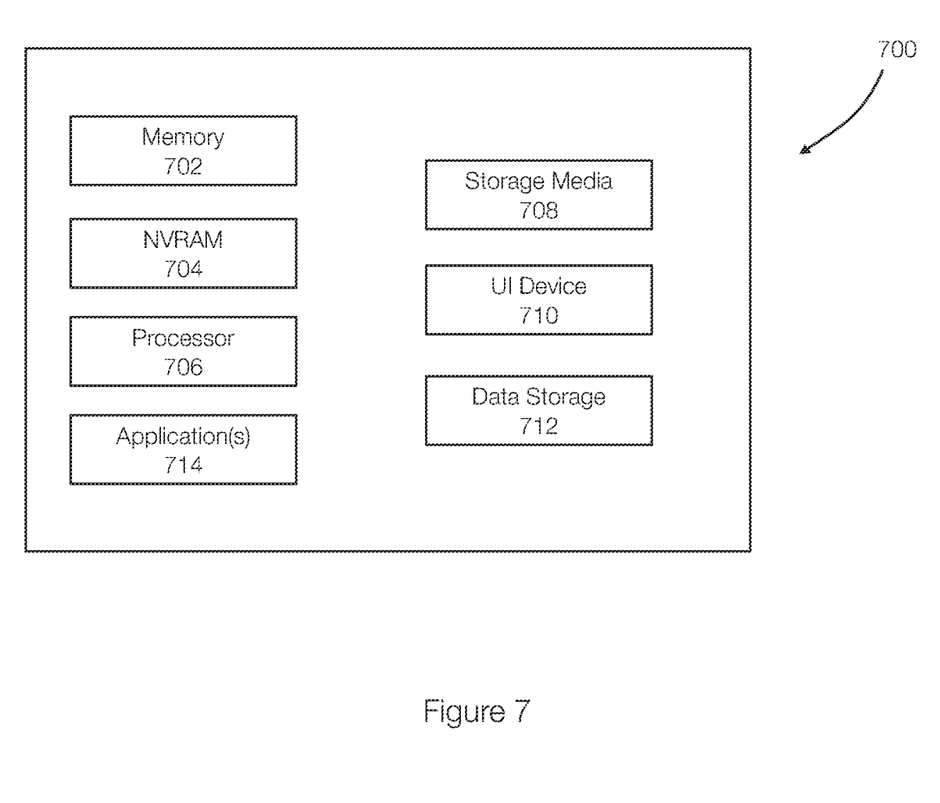
FIG. 7 discloses aspects of a computing device, system, or entity.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
generating sensor data at a node in an environment, the sensor data including at least inertial data;
receiving delayed position data from a near edge node, wherein the near edge node generates the delayed position data from a raw position data;
determining a predicted position of the node based on the sensor data and the delayed position data using a position engine, wherein the position engine determines the predicted position using a dead reckoning method when a ground truth position is known and an elapsed time from moving from the ground truth position is less than a threshold value and/or a position model configured to predict the predicted position;
generating aligned data that includes the predicted position and the sensor data; and
detecting an event based on the aligned data with an event detection model.

2. The method of claim 1, wherein the position engine relies on the model when the elapsed time is greater than the threshold value, wherein the position model is trained using historical inertial measurements, bearing and rich movement data, and/or classifications of an operational state.

3. The method of claim 2, wherein the position model is trained using historical position data including historical trajectories.

4. The method of claim 3, wherein training using the historical position data includes a supervised learning task using past trajectories to determine a next position based at least on one or more previous positions.

5. The method of claim 2, wherein determining the predicted position includes interpolating a first delayed position and a second delayed position relative to a sensor data collection.

6. The method of claim 2, wherein determining the predicted position includes predicting a position for a most recent sensor data collection.

7. The method of claim 2, wherein determining the predicted position includes predicting a position for a time after the most recent sensor data collection.

8. The method of claim 7, wherein a sensor collection for the time after the most recent sensor data collection is generated by extrapolating the most recent sensor data collection or by copying the most recent data collection into the sensor collection for the time after the most recent sensor data collection.

9. A non-transitory storage medium having stored therein instructions that are executable by one or more hardware processors to perform operations comprising:
generating sensor data at a node in an environment, the sensor data including at least inertial data;
receiving delayed position data from a near edge node, wherein the near edge node generates the delayed position data from a raw position data;
determining a predicted position of the node based on the sensor data and the delayed position data using a position engine, wherein the position engine determines the predicted position using a dead reckoning method when a ground truth position is known and an elapsed time from moving from the ground truth position is less than a threshold value and/or a position model configured to predict the predicted position;
generating aligned data that includes the predicted position and the sensor data; and
detecting an event based on the aligned data with an event detection model.

10. The non-transitory storage medium of claim 9, wherein the position engine relies on the model when the elapsed time is greater than the threshold value, wherein the position model is trained using historical inertial measurements, bearing and rich movement data, and/or classifications of an operational state.

11. The non-transitory storage medium of claim 10, wherein the position model is trained using historical position data including historical trajectories.

12. The non-transitory storage medium of claim 11, wherein training using the historical position data includes a supervised learning task using past trajectories to determine a next position based at least on one or more previous positions.

13. The non-transitory storage medium of claim 10, wherein determining the predicted position includes interpolating a first delayed position and a second delayed position relative to a sensor data collection.

14. The non-transitory storage medium of claim 10, wherein determining the predicted position includes predicting a position for a most recent sensor data collection.

15. The non-transitory storage medium of claim 10, wherein determining the predicted position includes predicting a position for a time after the most recent sensor data collection.

16. The non-transitory storage medium of claim 15, wherein a sensor collection for the time after the most recent sensor data collection is generated by extrapolating the most recent sensor data collection or by copying the most recent data collection into the sensor collection for the time after the most recent sensor data collection.

* * * * *